United States Patent

[11] 3,532,081

[72] Inventor James Middleton Eastman
South Bend, Indiana
[21] Appl. No. 712,976
[22] Filed March 14, 1968
[45] Patented Oct. 6, 1970
[73] Assignee The Bendix Corporation
a corporation of Delaware

[54] FLUIDIC DIGITAL CONTROL APPARATUS HAVING MULTI-PHASE CONTROL FREQUENCY
12 Claims, 9 Drawing Figs.

[52] U.S. Cl. .................................. 123/103,
60/39.28, 137/81.5
[51] Int. Cl. ...................................... F02d 11/08
[50] Field of Search.......................... 137/36, 37,
16, 18, 26, 27, 28, 29, 81.5; 60/39.28

[56] References Cited
UNITED STATES PATENTS

| | | | |
|---|---|---|---|
| 3,260,271 | 7/1966 | Katz .......................... | 137/36 |
| 3,292,648 | 12/1966 | Colston ....................... | 137/36 |
| 3,392,739 | 7/1968 | Taplin ......................... | 137/36X |
| 3,444,873 | 5/1969 | Preli ............................ | 137/37X |
| 3,444,875 | 5/1969 | Furlong ....................... | 137/37 |

*Primary Examiner*—Clarence R. Gordon
*Attorneys*—Gordon H. Chenez and Plante; Hartz, Smith and Thompson

ABSTRACT: Engine governor apparatus having a reference speed variable frequency fluid pulse generator and an engine speed variable frequency fluid pulse generator one of which generates a four phase fluid pulse output against which the other fluid pulse generator output is compared. The reference speed and engine speed fluid pulses provide a control input to a plurality of pulse operated fluidic devices which respond to the outputs of the two fluid pulse generators in accordance with a synchronization of the pulse output of the other generator with the four phase pulse output of the one generator. The direction of engine speed error is established by the order of synchronization of the four phase pulse output and the pulse output compared therewith. The magnitude of the speed error is established by the frequency at which the pulses synchronize. A control fluid pulse output at this synchronization or "beat" frequency is generated by either of two fluidic devices one of which is connected to respond to the four pulse outputs in a first sequential order representing engine overspeed and the other of which is connected to respond to the four pulse outputs in a second sequential order representing engine underspeed. The engine fuel flow rate is caused to step up or down in small increments with the control fluid pulses. An analog proportional governing action is added to this digital governing action.

Fig. 3

INVENTOR.
JAMES M. EASTMAN

INVENTOR.
JAMES M. EASTMAN
BY
Gordon N. Cheney
AGENT

— 3,532,081 —

FLUIDIC DIGITAL CONTROL APPARATUS HAVING MULTI-PHASE CONTROL FREQUENCY

BACKGROUND OF THE INVENTION

This invention relates to a control system of the type wherein an output member is actuated as a function of the relative error between a reference input signal and a variable input signal derived from a condition to be controlled in predetermined relation to the reference input signal. The present invention is particularly adapted but not limited, as will be recognized by those skilled in the art, to use as a combustion engine speed control wherein the above-mentioned reference input signal and variable input signal correspond to a selected engine speed and existing engine speed, respectively, and the above-mentioned output member controls engine fuel flow in accordance with the engine speed error to eliminate the latter.

Numerous prior art governor devices have been proposed or are in use for controlling variable speed combustion engines some of which governors are relatively simple mechanisms satisfactory for engines where governor response time, accuracy and reliability are of little concern whereas others are complicated mechanisms designed to approach the ultimate in response, accuracy and reliability characteristics necessitated by sophisticated engines such as gas turbine engines or other relative high performance engines. Unfortunately, the size, weight and/or cost normally increases in proportion to the complexity of governor structure thereby rendering the most acceptable governor a compromise relative to its operational environment which, in the case of an aircraft gas turbine engine, may be subject to severe size and weight limitations as well as reliability and accuracy of operation.

The introduction of pure fluid or fluidic devices in the relatively recent past has provided an opportunity for reducing the complexity of certain control systems by replacing motion, and/or force transmitting networks requiring mechanical members with fluidic devices operating on the basis of a high energy jetstream of fluid deflectable relative to a plurality of fluid receiving output ports by one or more control streams of fluid of relatively small energy compared to that of the jetstream against which the control fluid streams are directed transversely. Such fluidic devices which are characteristically small, and lightweight exhibit fast response and reliability as well as high control to output fluid flow and/or pressure gain and, in addition, are substantially immune to environmental vibration, temperature, humidity and the like. Furthermore, such fluidic devices require no moving parts thus eliminating the problem of wear of mechanical parts and are relatively simple and economical to construct.

The present invention in the form of the proposed engine speed governor utilizes the above-mentioned fluidic devices to a maximum extent in a unique control network which has the desirable governor characteristics of simplicity, reliability, accuracy and fast response.

SUMMARY OF THE INVENTION

It is an object of the present invention to provide a combustion engine all-speed governor which utilizes fluidic control components to convert an engine speed input signal to an engine control output signal with accuracy, reliability and quick response.

It is an important object of the present invention to provide a fluidic control system for producing a control output variable frequency pulsating fluid pressure which varies as a function of the relative error between two input variable frequency pulsating fluid pressures.

It is a further object of the present invention to provide a fluidic digital engine speed governor having a multi-phase pulse frequency fluid pressure reference, or a multi-phase pulse generator for engine speed sensing.

BRIEF DESCRIPTION OF THE DRAWINGS

FIG. 2A is an enlarged view of a portion of FIG. 2;

DESCRIPTION OF THE PREFERRED EMBODIMENTS

Figure 1:
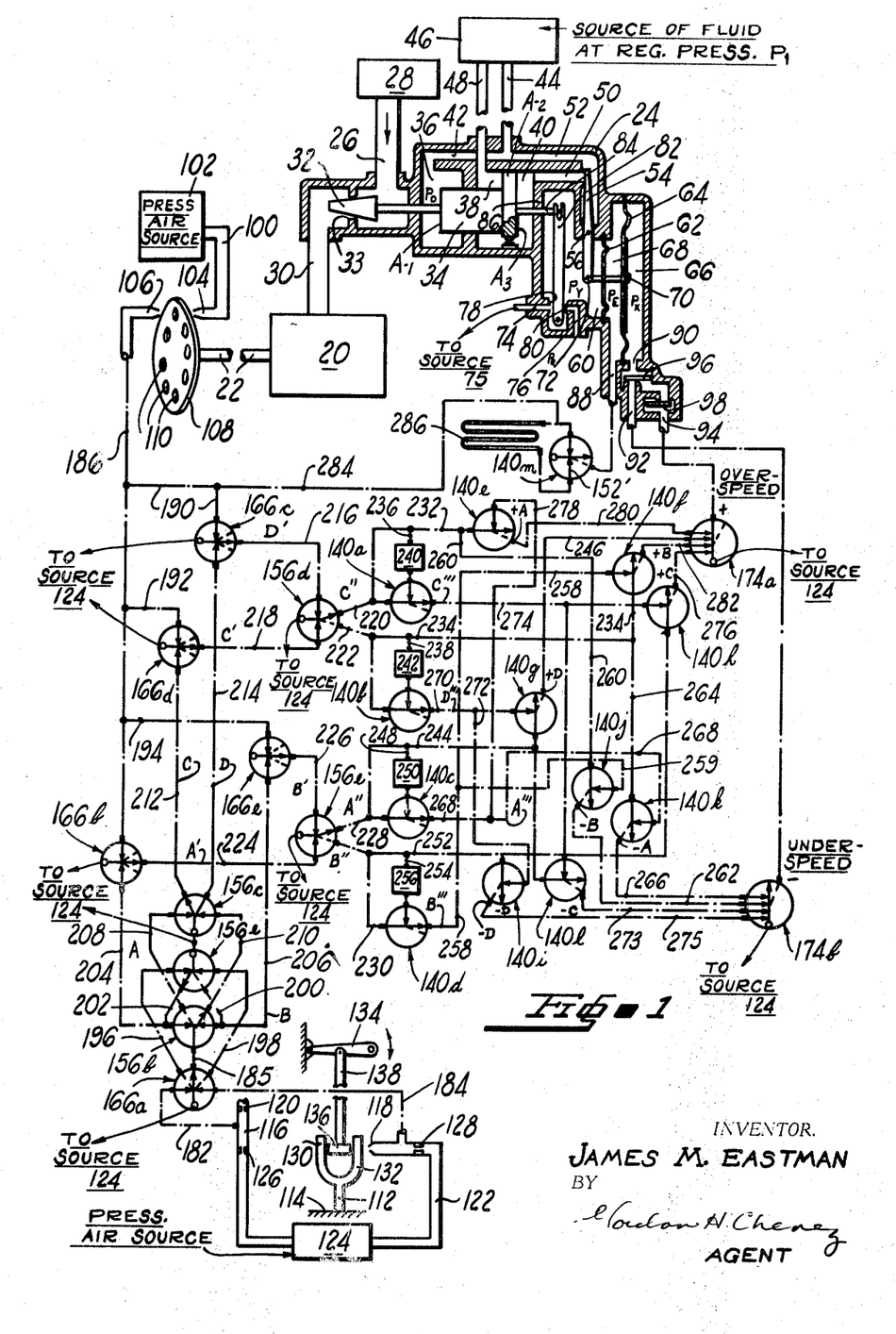
FIG. 1 is a schematic representation of a combustion engine and fuel control system therefor embodying the present invention.

Referring to FIG. 1, numeral 20 represents a conventional combustion engine preferably of the gas turbine type shown in block form since the structural characteristics of such engines are well known in the art. A shaft 22 suitably connected to the engine provides an output rotation indicative of engine rotational speed.

A fuel control includes a casing 24 having an inlet conduit 26 connected to a pressurized source of fuel generally indicated by 28 and an outlet conduit 30 connected to deliver metered fuel flow to the combustion chambers of engine 20. A metering valve 32 cooperates with a metering orifice 33 in series flow relationship with inlet and outlet conduits 26 and 30 to thereby provide fuel flow to the engine which varies as a function of the position of metering valve 32. A multidiameter fluid pressure actuated piston 34 slidably carried in casing 24 together therewith defines three fluid chambers 36, 38 and 40 to which the smaller diameter end portion area $A_1$, intermediate annular portion area $A_2$ and largest diameter end portion area $A_3$, respectively, of piston 34 are exposed. A passage 42 connects chamber 36 with conduit 44 leading to a drain source at relatively low fluid pressure $P_0$ which drain source may be on the low pressure side of a conventional fluid pressure regulator generally indicated by 46. The high pressure side of the pressure regulator is connected via a passage 48 to chamber 38 and serves to maintain a flow of fluid at substantially constant supply pressure $P_1$ thereto. A fixed area restriction 50 suitably secured to piston 34 communicates chamber 38 with chamber 40 which chamber 40, in turn, is vented via passages 50 and 52 to conduit 44 at drain fluid pressure $P_0$. A lever 54 pivotally secured to casing 24 as by pin 56 is provided with a servo valve member 58 at one end thereof which cooperates with the discharge end of passage 50 to vary the effective flow area thereof and thus the fluid pressure level in chamber 40. The opposite end of lever 54 extends into a chamber 60 partially defined by a diaphragm 62 attached at its radially outermost portion to casing 24 by any suitable conventional means, not shown, providing a fluid seal. A second diaphragm 64 of larger area compared to diaphragm 62 partially defines a chamber 66 and together with diaphragm 62 partially defines an intermediate chamber 68. Diaphragm 64, like diaphragm 62, is secured to casing 24 by any suitable conventional means, not shown, providing a fluid seal. A stem 70 suitably secured to diaphragms 62 and 64 provides a rigid connection therebetween and through a pivotal connection 72 with lever 54 serves to actuate lever 54 in response to the fluid pressures $P_u$, $P_e$ and $P_r$ in chambers 60, 68 and 66, respectively, as will be described hereinafter.

The chamber 60 is provided with an inlet passage 74 connected to receive air at high pressure $P_1$ from a suitable source 75 which may be compressor discharge air in the case of a gas turbine engine and an outlet passage 76 communicating with a suitable low pressure air drain source such as the atmosphere at pressure $P_a$. The passages 74 and 76, are provided with opposing valve seats 78 and 80, respectively, aligned in spaced apart relationship to permit a lever 82 pivotally secured at one end to casing 24 and extending between seat 78 and 80 to move toward or away from either seat 78 or 80 thereby causing a simultaneous increase in effective flow area of seat 78 and decrease in effective flow area of seat 80 or decrease in flow area of seat 78 and increase in area of seat 80 depending upon the direction of movement of lever 82 thereby controlling the pressure $P_u$ level in chamber 60. The lever 82 is pivotally engaged at its opposite end with a stem 84 integral with piston 34 and slidably carried in a wall 86 separating chambers 40 and 60.

The chamber 68 is provided with an inlet passage 88. The chamber 66 is provided with an inlet portion 90 which communicates with either of two inlet passages 92 or 94 via check valves 96 and 98 arranged in flow controlling relationship with passages 92 and 94, respectively, depending upon the fluid pressure pulse output of the fluidic logic control network connected thereto.

The fluid logic control network includes two fluid pressure pulse generating input devices one of which may take the form of an air passage 100 connected to receive a flow of pressurized air from a suitable source generally indicated by 102 which also may be compressor discharge air in the case of a gas turbine engine and provided with a discharge nozzle 104 opening to a suitable relatively low pressure drain source such as the atmosphere, $P_a$. A flow receiver 106 axially aligned with and spaced from nozzle 104 is adapted to receive flow from nozzle 104. A siren like disc or wheel 108 having a plurality of angularly equally spaced apart holes or ports 110 is secured to shaft 22 and rotated thereby. The wheel 108 is suitably mounted between nozzle 104 and receiver 106 to enable the holes 110 to pass in succession between these members allowing flow from nozzle 104 to receiver 106 to alternately pass and be interrupted to generate a series of fluid pressure pulses in receiver 106 having a frequency corresponding to the speed of rotation of member 108. Siren type fluid pressure pulse generators similar to the one described above are well known in the art.

The second fluid pulse generating input device may take the form of a tuning fork 112 having its base anchored to a suitable fixed support 114. The tuning fork 112 is adapted to vibrate relative to a discharge nozzle 118 communicating with a passage 122 which receives a flow of pressurized air from a suitable source generally indicated by 124 which, like sources 75 and 102 may be compressor discharge air. A passage 116 containing restrictions 120 and 126 receives air from source 124 and exhausts to atmospheric air pressure $P_a$. Restriction 128 is secured in passage 122 upstream from the nozzle 118. Vibration of tuning fork 112 at its natural frequency results in tine 132 of fork 112 vibrating toward and away from nozzle 118 thereby varying the flow area thereof to generate a series of fluid pressure pulses intermediate nozzle 118 and restriction 128 having a known frequency corresponding to that of the tuning fork 112. By suitable design these pressure pulses lag movement of the fork tine so that they push on the tine 132 in a manner to sustain the vibration, thus acting as an oscillator. Natural pressure transients in starting the engine are sufficient to initiate oscillation. The frequency of vibration of tuning fork 112 may be made variable to provide a range of pressure pulse frequencies corresponding to a desired range of engine speed request positions by an engine control lever 134. To that end, a tuning fork slug 136 may be suitably clamped for sliding movement between the tines of tuning fork 112. The slug 136 is suitably attached to control lever 134 by a link 138 and moved thereby longitudinally along tuning fork 112 to modify the effective length of tine 132 and thus the frequency of vibration thereof as a function of the position of control lever 134. In this manner the pressure pulse frequency in passage 122 is made to vary depending upon the requested engine speed established by the control lever 134.

Reference is made to U.S. Pat. No. 3,302,398 issued Feb. 7, 1967, to L. B. Taplin et al., common assignee, for additional details of pressure pulse generating structure similar to that of the above described reference speed fluid pressure pulse generator.

In the following description of the remaining portion of the fluidic control circuitry, reference is made to FIGS. 5, 6, 7 and 8 for further details of the various fluidic switching devices shown schematically in FIGS. 1 and 2.

Figure 5:
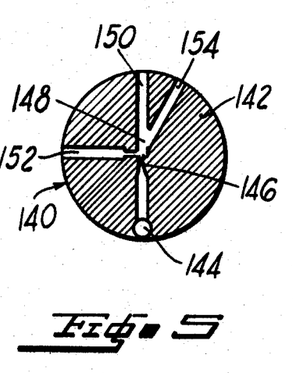
FIG. 5 illustrates in greater detail the physical characteristics of the fluidic devices commonly known as "gate" shown schematically in FIGS. 1 and 2.

FIG. 5 illustrates a conventional fluidic gate 140 defined by a casing 142 having an inlet port 144 connected to receive pressurized air from a suitable source such as 124. A nozzle 146 downstream from inlet port 144 discharges the pressurized air in the form of a power jetstream into a jet interaction chamber 148 to output passage 150 aligned with nozzle 146. A restricted control air passage 152 connected to a suitable source of controlled pressurized air is adapted to inject a control jetstream into chamber 148 transversely against the power jetstream causing deflection of the latter toward a branch output passage 154 extending from chamber 148 angularly relative to output passage 150. The relatively high energy power jetstream is deflected by the relatively low energy control jetstream thereby directing the power jetstream flow into output passage 154. In the absence of a control jetstream the power jet passes freely into passage 150 and no flow enters passage 154. With control flow through 152, the power jet is denied entry into 150 and must flow instead into 154.

Figure 6:
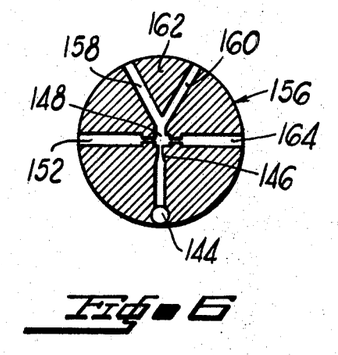
FIG. 6 illustrates in greater detail the physical characteristics of the fluidic devices commonly known as "bistable" shown schematically in the control networks of FIGS. 1 and 2.

FIG. 6 illustrates a bistable fluidic switch 156 wherein structure similar to that of FIG. 5 is identified by like numerals. The switch 156 is provided with output passages 158 and 160 angularly separated by a wedge shaped splitter 162 aligned with nozzle 146. A restricted control air passage 164 aligned with opposing control air passage 152 is connected to a second suitable source of controlled pressurized air and adapted to inject a control jetstream into chamber 148 transversely against the power jetstream. The power jetstream is deflected toward output passage 158 or 160 in response to a control jetstream from control air passages 164 or 152, respectively. The side walls of the chamber 148 merge with the associated side walls of output passages 158 and 160 and are curved to generate the well-known "Coanda Effect" which, briefley stated, has the effect of producing fluid attachment of the power jetstream to one or the other of the side walls leading to output passages 158 and 160 such that the power jetstream is maintained in a corresponding deflected condition thereby directing the entire power jetstream into one of the output passages after the cessation of the control jetstream which initially directed it into that output passage depending upon which of the walls the power jet attaches to. The power jetstream may be detached from one wall and deflected into attachment with the opposite wall by injecting control flow from the opposite control air passage to overcome the Coanda Effect and deflect the power jetstream accordingly. The bistable fluid switch is seen to exhibit "memory" in that it remembers and continues to obey its last control flow command. A pulse of pressure in passage 152 or 164 is sufficient to switch the power jet into 160 or 158.

Figure 7:
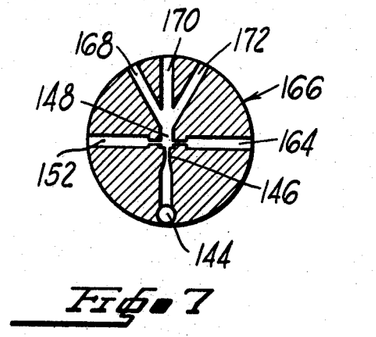
FIG. 7 illustrates in greater detail the physical characteristics of a triple output fluid device shown schematically in FIGS. 1 and 2.

FIG. 7 illustrates a triple output fluidic switch 166 wherein structure similar to that of FIG. 6 is identified by like numerals. The switch 166 is provided with output passages 168, 170 and 172 two of which diverge away from the remaining intermediate passage. Intermediate passage 170 is aligned with nozzle 146 and in the absence of control flow from control air passage 152 or 164, or for concurring equal flows from these passages, receives the entire power jetstream flow. The power jetstream may be deflected toward output passages 168 and 172 by injecting control flow from control air passages 164 and 152, respectively. The frequency of deflection between output passages 168 and 172 of the power jetstream depends upon the relative frequency of pressurized air pulses injected by control air passages 152 and 164 with the intermediate output passage 170 being variably pressurized depending upon the rate at which the power jetstream sweeps over the same. The power jetstream will pass directly into output passage 170 in the event of simultaneous and equivalent pressure pulses at control air passages 152 and 164.

If pulses at 152 and 164 are 180° out of phase, equivalent amplified pulses will emerge at the same frequency from 172 and 168. Since the power jet passes 170 twice each cycle, a pulse at double the input frequency will emerge therefrom, reaching its maximum when the inputs are equal. If pulse trains in 152 and 164 are of unequal frequency, their phase relationship will vary such that the pulses will synchronize at their difference or "beat" frequency. When pulses are synchronized the power jet is seen to be aimed steadily into center output passage 170 giving it maximum flow. When they are 180° out of phase the power jet sweeps by 170 the fastest, giving it the lowest average flow.

Figure 8:
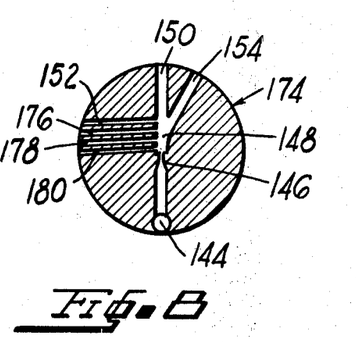
FIG. 8 illustrates in greater detail the physical characteristics of the fluidic devices commonly known as "or-nor" shown schematically in FIGS. 1 and 2.

FIG. 8 illustrates a fluidic "or–nor" switch 174 similar to gate 140 with the exception of three additional control air passages 176, 178 and 180. The power jetstream discharged by nozzle 146 is deflected away from passage 150 and toward output passage 154 in response to each pressurized air pulse applied to one or more of the control air passages 152, 176, 178 and 180.

It should be noted that the "gate", the "bistable" switch, and the "or–nor" switches of FIGS. 5, 6 and 8 are essentially "off-on" devices in that their response is essentially the same to control pressures varying anywhere between some low threshold value, and some much larger maximum control pressure limit.

In the following description of fluidic switching device control circuitry, the terms "left" and "right" will be used to designate the appropriate control air passages and/or output passages of any given fluidic switch with reference to looking in the direction of flow out of the power jetstream nozzle thereof. Also, the numeral applied to each of the fluidic switch devices will correspond to the similar type of fluidic switch shown in FIGS. 5 to 8 and an added letter will be used to distinguish one switch from another switch of the same type. It will be understood that certain of the output passages of the various fluidic switches are not connected to supply a control air pressure in which case these output passages vent to a suitable drain source such as the atmosphere at pressure $P_a$.

Referring to FIG. 1, a triple output fluidic switch 166a has its left control air passage 152 connected via a passage 182 to passage 116 intermediate restriction 126 and restriction 120 and its right control air passage 164 connected via a passage 184 to passage 122 intermediate restriction 128 and nozzle 118. A passage 186 connects receiver 106 with the left control passage 152 of a triple output fluidic switch 166b. Branch passages 190, 192 and 194 connect passage 186 with the left control air passage 152 of triple output fluidic switches 166c, 166d and 166e, respectively.

The left and right output passages 168 and 172 of fluidic switch 166a are connected via passages 196 and 198, respectively, to right and left control air passages 164 and 152 of a bistable fluidic switch 156a. Intermediate output passage 170 of switch 166a is connected via passage 185 to inlet port 144 of a bistable fluidic switch 156b. Left and right output passages 158 and 160 of switch 156a are connected via passages 200 and 202, respectively, to right and left control air passages 164 and 152 of a bistable fluidic switch 166b. A branch passage 204 connects passage 202 with the right control air passage 164 of triple output fluidic switch 166b. A branch passage 206 connects passage 200 with the right control air passage 164 of triple output fluidic switch 166e.

The left and right output passages 158 and 160 of bistable switch 156b are connected via passages 208 and 210, respectively, to the left and right control air passages 152 and 164 of a bistable switch 156c which, in turn, has its left and right output passages 158 and 160 connected via passages 212 and 214, respectively, to the right control air passage 164 of fluidic switch 166d and right control air passage 164 of fluidic switch 166c, respectively.

The intermediate output passage 170 of triple output fluidic switches 166c and 166d are connected via passages 216 and 218, respectively, to the left and right control air passages 152 and 164, respectively, of a bistable switch 156d which, in turn, has its left and right output passages 158 and 160 connected via passages 220 and 222, respectively, to inlet port 144 of gate switches 140a and 140b, respectively.

The intermediate output passages 170 of triple output fluidic switches 166b and 166e are connected via passage 224 and 226, respectively, to the right and left control air passages 164 and 152 of a bistable switch 156e which, in turn, has its left and right output passages 158 and 160 connected via passages 228 and 230, respectively, to the inlet port 144 of gate switches 140c and 140d, respectively.

Branch passages 232 and 234 connect passages 220 and 222, respectively, with inlet port 144 of gate switches 140e and 140f, respectively. Branch passages 236 and 238 connect passages 232 and 234, respectively, with left control air passages 152 of gate switches 140a and 140b, respectively. Sealed chambers 240 and 242 in series flow relationship with branch passages 236 and 238, respectively, are of predetermined volume and serve to introduce a lag in air pressure transmitted through associated passages 236 and 238 as will be described hereinafter.

A branch passage 244 connects passage 228 with the inlet port 144 of a gate switch 140g which, in turn, has its right output passage 154 connected via a passage 246 to control air passage 176 of an "or–nor" switch 174a. A branch passage 248 including a sealed chamber 250 defining an air pressure lag volume connects passage 244 with left control air passage 152 of gate switch 140c. A branch passage 252 connects passage 230 with the inlet port 144 of gate switches 140h and 140i. A branch passage 254 including a sealed chamber 256 defining an air pressure lag volume connects passage 252 with left control air passage 152 of gate switch 140d which, in turn, has its left output passage 150 connected via a passage 258 to left control air passage 152 of gate switch 140f. A branch passage 259 connects passage 258 to control air passage 152 of gate switch 140j.

A branch passage 260 connects passage 232 with inlet port 144 of gate switch 140j which, in turn, has its right output passage 154 connected via a passage 262 to control air passage 176 of an "or–nor" gate switch 174b. A branch passage 264 connects passage 234 to inlet port 144 of gate switch 140f. Gate switch 140k has its right output passage 154 connected via a passage 266 to control air passage 152 of "or–nor" switch 174b. A passage 268 connects left output passage 150 of gate switch 140c to left control air passage 152 of gate switch 140k. A passage 270 connects left output passage 150 of gate switch 140b to left control air passage 152 of gate switch 140g and a branch passage 272 connects passage 270 to left control air passage 152 of gate switch 140i. The right output passage 154 of gate switch 140L is connected via a passage 273 to control air passage 178 of "or–nor" switch 174b. The right output passage of gate switch 140i is connected via a passage 275 to control air passage 180 of switch 174b.

The gate switch 140a has its left output passage 150 connected via a passage 274 to the left control air passage 152 of gate switch 140h which, in turn, has its right output passage 154 connected via a passage 276 to control air passage 180 of "or-nor" switch 174a.

The gate switch 140e has its left control air passage 152 connected to passage 268 via a branch passage 278 and its right output passage 154 connected to control air passage 152 of "or-nor" switch 174a via a passage 280.

The gate switch 140f has its right output passage 154 connected via a passage 282 to control air passage 178 of "or-nor" switch 174a.

The "or-nor" switch 174a has its left output passage 150 connected to passage 94 leading to fuel control casing 24.

The "or-nor" switch 174b has its right output passage 154 connected to passage 92 leading to fuel control casing 24.

Gate switch 140m is provided with an additional control air passage 152' which is aligned with opposing left control air passage 152. A branch passage 284 connects passage 190 to the left control air passage 152 of gate switch 140m. A relatively long passage 286 which serves as an air pressure delay line connects branch passage 284 to right control air passage 152' of gate switch 140m. The right output passage 154 of gate switch 140m is connected to passage 88 leading to fuel control casing 24.

OPERATION OF FIGURE 1

It will be assumed that air under pressure is being supplied to those elements requiring the same for control energization thereof.

Figure 3:
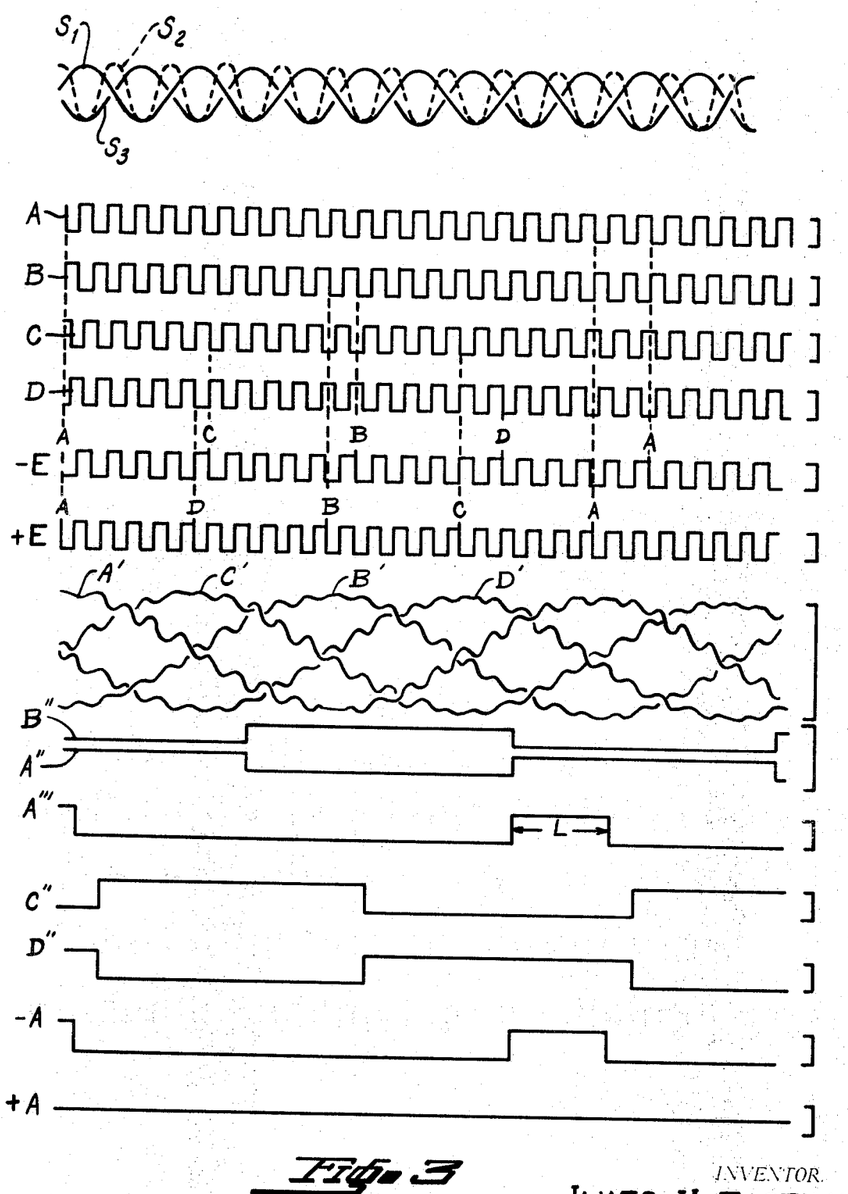
FIG. 3 illustrates a plurality of curves corresponding to the fluid pressure pulses of varying frequency generated in response to the reference pressure input and controlled condition pressure input referenced thereto as well as the phase relationship thereof which provides an indication of the relative error therebetween for the embodiment of FIG. 1.

The reference pulse generator including tuning fork 112 is self-exciting in that the air jet passing out of nozzle 118 and impinging against tine 132 causes tuning fork 112 to oscillate at a frequency corresponding to the regulated speed position of control lever 134 as established by the longitudinal position of slug 136 relative to the tine 132. The oscillation of tine 132 causes an alternating increase and decrease in effective flow area of nozzle 118 such that a train of pressure pulses is generated intermediate nozzle 118 and associated restriction 128. It will be noted that the train of pressure pulses is impressed upon control air passage 164 of fluidic switch 166a. The opposing control passage 152 has a fixed bias pressure of an amount intermediate between the maximum and minimum pressures in passage 164, thus causing the power jetstream of switch 166a to deflect back and forth between output passages 168 and 172 at the reference pulse frequency generated by tuning fork 112. The fixed bias pressure is generated from air pressure source 124 by adjusting the area ratio of restrictions 126 and 116 as desired. The intermediate output passage 170 of switch 166a is pressurized to the extent of intermittent communication of the power jetstream therewith. The resulting pressure pulses generated at the left and right output passages 168 and 172 of switch 166a pass to right and left control air passages 164 and 152, respectively, of bistable switch 156a causing the power jetstream to deflect each time the input pressure differential thereacross reverses and increases to the value required to overcome the bistable latching properties of the switch 156a. Referring to FIG. 3, the sinusoidal curves $S_1$, $S_2$ and $S_3$ represent the pressure outputs of output passages 168, 170 and 172, respectively, of switch 166a. The square wave pressure pulse trains A and B indicate the series of pressure pulses generated at output passages 158 and 160 of bistable switch 156a in response to the input pressure pulses applied thereto. Note that $S_1$, $S_2$ and $S_3$ are to a different time scale than A and B. The output pressure $S_2$ at intermediate output passage 170 of switch 166a peaks alternately during pressurization of output passage 158 and 160 of switch 156a, the pressure being retained in one of these passages by the bistable switch action until signaled to reverse by a pressure pulse ($S_1$ or $S_3$) from passage 168 or 172 of switch 166a. The bistable switch 156b receives the output pulse $S_2$ from intermediate output passage 170 of switch 166a which flow is thus alternately deflected between output passages 158 and 160 of switch 156b. The pressure pulses alternately received in output passages 158 and 160 of switch 156b are transmitted to control air passages 152 and 156, respectively, of bistable switch 156c whereupon the power jet stream thereof is deflected to alternately pressurize its output passages 158 and 160. Referring to FIG. 3, the square wave pressure trains C and D represent the pressure outputs of output passages 158 and 160, respectively, of switch 156c which will be noted to have a 180° phase relationship with each other and which are approximately 90° out of phase with A and B representing the output of switch 156a. It will be noted that switches 166a, 156a, 156b and 156c cooperate to convert the two phase sinusoidal pressure output indicated by curves $S_1$ and $S_3$ and generated in part by tuning fork 112 to a four phase square wave reference frequency pressure output as indicated by curves A, B, C and D.

The square wave pressure pulse wave designated as —E in FIG. 3 represents a typical pressure pulse output generated by rotation of wheel 108 in response to the engine 20 operating at a 5 percent underspeed condition relative to a requested engine speed corresponding to the position of control lever 134 as indicated by wave trains A, B, C and D. As the wheel 108 rotates, each hole 110 thereof passes in succession between nozzle 104 and receiver 106 to alternately interrupt the flow therebetween and generates a corresponding series of pressure pulses having a frequency which is a predetermined function of the speed of rotation of member 108 and thus engine speed. Referring to FIG. 3 and curves A, B, C, D and —E, it will be noted that the pressure pulses —E generated by nozzle 104 and wheel 108 synchronize successively with the four separate reference pressure pulses in the order of A, C, B, D, A . . . etc. In the event of a 5 percent engine overspeed error, a series of pressure pulses corresponding to the square wave curve designated +E would be generated by nozzle 104 and wheel 108. With a 5 percent engine overspeed error, the synchronizing sequence of the +E pressure pulses with the reference pressure pulses is different than that of the —E pressure pulses as indicated in FIG. 3 wherein the +E pressure pulses synchronize with the reference pulses in the order A, D, B, C, A . . . etc. As a result of the above-mentioned synchronizing relationship, it will be recognized that each time an engine speed generated pulse synchronizes with one of the four reference frequency pulses, the relative error between existing engine speed and requested speed is indicated by which one of the remaining three reference frequency pulses was last in synchronization. Thus, engine underspeed error is indicated by the synchronization sequences DA, CB, AC and BD whereas overspeed error is indicated by sequences CA, DB, BC and AD. Synchronization with one of the reference frequency pulse series A, B, C and D repeats at the "beat" or difference frequency between the reference pulses and engine speed generated pulses. The engine speed generated pulse synchronizes with one or another of the reference frequency pulses at four times the "beat" frequency.

A very small engine fuel flow correction is made each time an engine generated pulse synchronizes with a reference frequency pulse with the relative direction of the fuel flow change being determined by the last prior frequency pulse synchronization thereby correcting fuel flow to the engine at a frequency proportional to the engine speed error. To that end, the left control air passage 152 of each of the switches 166b, 166c, 166d and 166e receives the engine speed generated pulses from passage 186. The right control air passages 164 of switches 166b, 166c, 166d and 166e each receive one of the four reference frequency pressure pulses via right output passage 160 of switch 156a, right output passage 160 switch 156c, left output passage 158 of switch 156c and left output passage 158 of switch 156a, respectively, which reference frequency act in opposition to the engine speed generated pulses. Pressurization of the intermediate output passages 170 of the switches 166b, 166c 166d and 166e is a maximum when the opposing pressure pulses arrive at control air passages 152 and 164 simultaneously thereby having the effect of cancelling each other which, in turn, results in the associated power jetstream passing undeflected into its intermediate output passage 170. A minimum pressurization of output passages 170 occurs when the opposing pressure pulses arrive at control air passages 152 and 164 in 180° out of phase relationship which results in the associated power jetstream being rapidly deflected between output passages 168 and 172 thereby passing over intermediate output passage 170 too fast to produce any significant pressurization of the latter.

The pressure outputs of intermediate output passages of switches 166b, 166c, 166d and 166e for the 5 percent engine underspeed condition (−E curve of FIG. 3) are shown in FIG. 3 by curves A', D', C' and B', respectively. The pressure outputs A', B', C' and D' vary at the "beat" frequency with a ripple corresponding to the frequency of the reference speed pulses generated by tuning fork 112. The magnitude of the ripple is determined by the effective engine speed pulse generator and reference frequency pulse wave shapes and by the damping characteristics of the passages 224, 216, 218 and 226 leading from the respective intermediate output passages 170. The square wave shapes shown for curves A, B, C, D and E of FIG. 3 may be modified as desired by suitable damping in the air supply passages to control port 152 and 164 of the switches 166b, 166c, 166d and 166e, to provide sloping pressure rise and fall thereby improving control characteristics. Referring to FIG. 3, the pressure A' is 180° opposed to B' and C' 180° opposed to D' but approximately 180° out of phase with A' and B' due to the phase relationship of the pressure pulse outputs A, B, C and D. Pressure outputs A' and B' derived from intermediate output passages 170 of switches 166b and 166e, respectively, are supplied to right and left control air passages 164 and 152, respectively, of bistable switch 156e. The power jetstream of switch 156e is deflected to left output passage 158 when pressure A' exceeds pressure B' to overcome the bistable latching effect of the power jetstream which then remains deflected to left output passage 158 until the pressure B' becomes an equivalent amount lower than A; at which time the power jetstream deflects back to right output passage 160. For the 5 percent engine underspeed error, the output pressure at left output passage 158 of switch 156e will take the form of curve A'' of FIG. 3 whereas the pressure output of right output passage 160 is the inverse of A'' as shown by curve B''.

Pressure outputs C' and D' derived from intermediate output passages 170 of switches 166d and 166c, respectively, are supplied to right and left control air passages 164 and 152, respectively, of bistable switch 156d which responds by deflection of its power jetstream in a manner similar to that of switch 156e heretofore described thereby generating pressure outputs at left and right output passages 158 and 160 of switch 156d which take the form of curves C'' and D'', respectively, shown in FIG. 3. However, the pressure outputs C'' and D'' are approximately 90° out of phase with pressures outputs A'' and B''.

When left output passage 158 of switch 156e is pressurized, the resulting pressure A'' passes to inlet port 144 of gate switch 140c as well as to chamber 250 communicating with left control air passage 152 of switch 140c. The power jetstream generated by pressure A'' at inlet port passes to left output passage 150 of switch 140c to produce output pressure A''' which remains pressurized until the pressure lag interval generated by chamber 250 expires whereupon left control air passage 152 of switch 140c is pressurized causing the power jetstream thereof to deflect to right output passage 154 which, in turn, results in depressurization of left output passage 152. Curve A''' of FIG. 3 corresponds to the pressure generated in left output passage 150 with the lag interval defined by L. The lag interval L may be generated by means other than chamber 250 as, for example, by the use of a relatively long passage, not shown, in series with passage 248 for increasing the flow transport time of the output pressure A'' to switch 140c.

The pressure A''' passes to left control air passages 152 of gate switches 140e and 140k, the inlet ports 144 of which are pressurized by pressures C''' and D''' respectively. As a result of the existing engine underspeed condition D''' is at a high pressure. The power jetstream of switch 140k derived from pressure D'' is deflected by pressure A''' to right output passage 154 resulting in a pressure pulse −A to control air passage 152 of switch 174b. Since an engine underspeed condition is present, the inlet port 144 of gate switch 140e is not pressurized by C'' such that the control air passage 152 pressure input A''' has no effect on the switch 140e. Thus, right output passage 154 of switch 140e remains unpressurized.

The pressure pulse −A produced by switch 140k indicates a synchronization sequence DA for the reference frequency pressure outputs thereby establishing an engine underspeed condition. Reference is made to FIG. 3 and the curve relationship shown therein. It will be noted that an engine overspeed condition would be indicated if pressure C'' rather than pressure D'' had increased in which case the switch 140e rather than switch 140k would have responded to pressure A''' to produce a pressure pulse +A to control air passage 152 of switch 174a thereby indicating a synchronization sequence CA for the reference frequency pressure outputs.

Reversal of the input pressure differential A'−C' to bistable switch 156e results in deflection of the power jet station thereof to right output passage 160 thereof with the resulting output pressure B'' passing to inlet ports 144 of gate switches 140d, 140f and 140i as well as lag chamber 256 communicating with left control air passage 152 of gate switch 140d. The resulting power jetstream generated in switch 140d passes to left output passage 150 thereof generating output pressure B''' for a brief interval corresponding to the time lag imposed on pressure B'' by chamber 256 in passing to control air passage 152 which, in turn, deflects the power jetstream to right output passage 154. The resulting pressure B''' pulse passes to control air passages 152 of gate switches 140j and 140f. The output pressure C'' at bistable switch 156d resulting from the power jetstream being deflected to left output passage 158 thereof is passed to inlet port 144 of gate switch 140j where the resulting power jetstream thereof is deflected by pressure B''' to output passage 154 with the resulting pressure pulse B− passing to control air passage 176 of switch 174b. Since gate switch 140f is not receiving a pressure D'' input at its inlet 144 at this time, the pressure B''' pulse at its control air passage 152 has no effect on output pressure at right output passage 154 leading to control air passage 178 of switch 174a.

The output pressure C'' from bistable switch 156d also passes to inlet port 144 of gate switch 140a as well as chamber 240 communicating with control air passage 152 of switch 140a with the power jetstream thereof resulting from pressure C'' passing to left output passage 150 for the brief interval of time before the lagged pressure C'' appears at control air passage 150 whereupon the power jetstream is deflected to right output passage 154. The resulting output pressure C'''' passes to control air passage of gate switches 140h and 140L. The inlet port 144 of gate switch 140L being pressurized by pressure A'' derived from left output passage 158 of bistable switch 156e generates a power jetstream in switch 140L which is deflected to right output passage 154 thereof producing a pressure pulse to control air passage 180 of switch 174b. Since gate switch 140b is not receiving a pressure B'' at its inlet at this time, the pressure C''' at its control air passage 152 has no effect on the output pressure at output passage 154.

Reversal of the input pressure differential C'−D' to bistable switch 156d results in deflection of the power jetstream thereof to right output passage 160 thereof with the resulting output pressure D'' passing to inlet ports 144 of gate switches 140b, 140f and 140k. The effect of pressure D'' on gate switches 140f and 140k has been described which leaves only gate switch 140b and the effect of pressure pulse D'' thereon to be described. The pressure pulse D'' to inlet port 144 of gate switch 140b results in the power jetstream thereof passing to left output passage 150 for the brief interval of time before the lagged pressure D'' appears at control air passage 152 whereupon the power jetstream is deflected to right output passage 154. The resulting output pressure D''' passes to control air passage 152 of gate switches 140g and 140i. The inlet port of gate switch 140i receives pressure B'' with the resulting power jetstream being deflected by pressure D''' to right output passage 154 of gate switch 140i. The resulting output pressure pulse −D passes to control air passage 180 of switch 174b. Since the inlet port 144 of gate switch 140g is not pressurized by pressure A'' at this time, the pressure D''' pulse at its control air passage 152 has no effect on the output pressure +D at right output passage 154 leading to control air passage 176 of switch 174a.

The switch 174b thus receives four pressure pulses for an engine under speed condition which are repeated in sequential order −A, −C, −B, −D. Since the power jetstream of the switch 174b is deflected to right output passage 154 whenever one of its control air passages 152, 176, 178 and 180 receives pressure pulses −A, −B, −C, −D, respectively, the pressure output of output passage 154 has a frequency which is four times the difference in the frequencies of the tuning fork 112 generated pressure output and the engine speed generated pressure output. The pressure pulses from switch 174b pass through passage 92 and check valve 96 into chamber 66 to generate pressure $P_x$ therein which pressure $P_x$ increases by a discrete amount in response to each pressure pulse. Thus, on the average, pressure $P_x$ increases at a rate proportional to the engine under speed error.

It will be recognized that an engine overspeed condition results in a corresponding change in the A'−B' and C'−D' input pressure pulse relationships to bistable switches 156d and 156e from that heretofore disclosed for the engine underspeed condition. The resulting output pressure A'', B'' and C'', D'' switching sequence of the bistable switches 156e and 156d, respectively, cause the various gate switches responsive thereto to operate in a manner somewhat similar to that described heretofore with regard to an engine under speed condition but with a modified sequence so as to produce a pressure pulse sequence +A, +D, +B, +C, +A ... etc., to switch 174a. The switch 174a, like switch 174b, in its response to pressure pulses −A, −C, −B, −D, responds to each pressure pulse +A, +D, +B, +C, +A ... etc. by depressurizing its left output passage 150 for each pressure pulse period. The output pressure of left output passage 150 of switch 174a communicates to chamber 66 via passage 94 and check valve 98 which is thus allowed to open during each pressure pulse period in a manner which tends to lower pressure $P_x$ by a discrete amount so that, on the average, pressure $P_x$ decreases at a rate proportional to the engine overspeed error.

The pressure $P_x$ acts against diaphragm 64 causing lever 54 and attached valve 58 to move thereby controlling the fluid pressure in chamber 40 to unbalance piston 34 accordingly, thereby actuating metering valve 32 to cause an increase or decrease in fuel flow to the engine depending upon the relative engine speed error. As the piston 34 moves, lever 82 attached thereto provides a feedback signal which as a result of the corresponding change in area of valve seat 78 adjacent to lever 82 causes pressure $P_y$ acting against diaphragm 62 in opposition to diaphragm 64 to vary to the extent necessary to stabilize the position of valve 38 thereby stabilizing piston 34. Since the metering valve 32 movement is proportional to pressure $P_x$, the rate of change of fuel flow to the engine is proportional to pressure $P_x$ or speed error thereby providing isochronous governing action. However, since $P_x$ actually changes in discrete steps, engine steady state is a low amplitude slow limit cycle the magnitude of which is determined by the fuel flow equivalent of one pressure $P_x$ step. The digital control action of the fluidic switching network causes a continuous stepping of pressure $P_x$ until either the engine speed synchronizes with the reference frequency input or a fuel flow over correction is made. Normally, the last fuel flow step will be in excess of that needed to correct the engine speed error.

The change in engine speed as a result of the last fuel flow step will be sensed and fuel flow corrected back one step which, in turn, will again be in excess of that required to correct the engine speed error. The value of one pressure $P_x$ step will vary inversely with the frequency of the tuning fork 112 and directly with the control network gain. Thus, for 1,000 c.p.s. tuning fork frequency, a 1 percent speed error gives 40 pulses per second from the appropriate gate switch. If 1 percent speed error is to provide 3 percent fuel flow correction, for example, the fuel flow step per pulse must be 3/40 or .075 percent; i.e., this is the maximum allowed fuel flow departure from its value for zero speed error during the steady state limit cycle. The actual limit cycle should be practically trivial in effect.

As speed error increases, the pulse frequency increases until saturation is reached when the "beat" period has reduced until it equals four times the pulse duration period L. Then the appropriate gate switch has a continuous output except for the brief interruptions required to switch from one control input to another. For example, if the lag time L is equivalent to 5 tuning fork 112 pulses, saturation will occur for a "beat" period of four times five or twenty input pulses which is equivalent to an error of 5 percent.

Referring to FIG. 1, an analog proportional fuel flow correction is included to improve transient response. To that end, the engine speed generated pressure pulse is transmitted via passage 190 and 284 to left control air passage 152 of gate switch 140m. A pressure pulse appearing at control air passage 152 causes the power jetstream of switch 140m to deflect to right output passage 154 thereof which results in an increased pressure $P_e$ to chamber 68. The pressure pulse through passages 190 and 284 also travels through delay passage 286 to right control air passage 152' of switch 140m where the delayed pressure pulse acts to unlatch the power jetstream and deflect the same to left output passage 150 thereby depressurizing chamber 68. The pressure pulse $P_e$ into chamber 68 is of fixed amplitude and duration regardless of the frequency of the engine generated pressure pulse. Since the pressure $P_e$ in chamber 68 exhausts into right output passage 154 between engine generated pressure pulses, the average value of pressure $P_e$ varies directly with engine speed. If a sudden engine load causes engine speed and thus pressure $P_e$ to drop, the resulting effect on diaphragms 62 and 64 causes the lever 82 to tilt thereby opening valve 38 to produce a proportionate opening of metering valve 32 as established by the feedback effect on pressure $P_y$ in chamber 60. The effect of pressure $P_e$ is independent of and additive to the concurrent corrective action generated by the speed error influenced on pressure $P_x$ in chamber 66.

If the tuning fork 112 frequency is sufficiently high, the pressure $P_x$ action is essentially equivalent to an analog integrating control. However, as engine speed error is reduced, the time between pulses, which is dead time in control response, increases inversely. For example, for 1,000 c.p.s. and a 1 percent speed error, the pressure $P_x$ stepping frequency is forty steps per second and the insensate interval between steps is 1/40 or .025 sec. At 5 percent speed error, the insensate interval is only .005 seconds whereas, at 1/10 percent speed error the interval is .25 seconds. This would be adequate for all but very fast responding engines, in which case control response time may be improved by increasing the tuning fork 112 frequency or suitable doubling or redoubling of the fluidic switch network of FIG. 1. For the latter arrangement, a duplicate set of four reference frequency pressure outputs could be set at a forty-five degree phase relationship with the switches 166a, 156a, 156b and 156c which results in cutting the lag time L in half and a doubled pressure $P_x$ stepping frequency.

Figure 2:
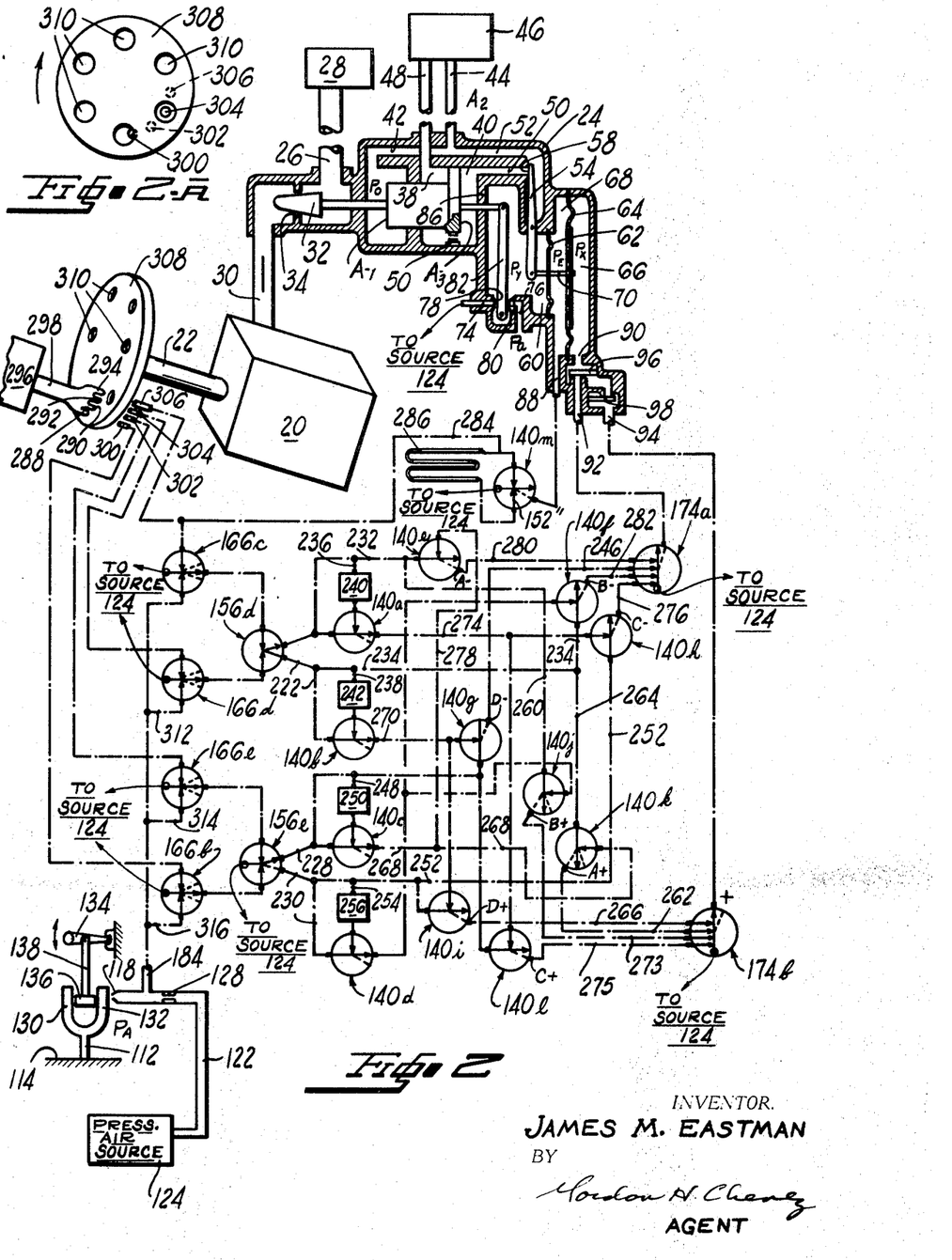
FIG. 2 is a schematic representation of a combustion engine and fuel control system therefor embodying a modified form of the present invention.

Referring to FIG. 2, the alternate embodiment of the present invention shown therein is similar to that of FIG. 1 modified to provide a four phase pressure pulse output generated as a function of engine speed rather than as a function of the position of the reference speed control lever position which results in elimination of the four fluidic switches, 156a, 156b, 156c and 166a, the bias pressure generating passage 116 and its restrictions 126 and 120, of FIG. 1. To that end, four nozzles 288, 290, 292 and 294 are supplied pressurized air from a suitable source 296 via a conduit 298. Four jet receiver pipes 300, 302, 304 and 306 are aligned with nozzles 288, 290, 292 and 294, respectively, in spaced apart relationship. An engine driven disc or wheel 308 attached to shaft 22 and provided with a plurality of angularly spaced apart ports 310 is situated between nozzles 288, 290, 292, 294 and associated receiver pipes 300, 302, 304 and 306. The disc or wheel 308 is rotated by the engine 20 causing sequential alignment of ports 310 with nozzles 288, 290, 292 and 294 thereby pressurizing receivers 300, 302, 304 and 306 accordingly to produce a series of pressure pulses at a frequency proportional to engine speed. It will be recognized that the angular spacing of nozzles 288, 290, 292 and 294 and receiver pipes 300, 302, 304 and 306 aligned therewith in relation to the size and angular spacing of ports 310 in wheel 308 as indicated by FIG. 2A determines the phase relationship of pressure pulses A, B, C, D generated in receiver pipes 300, 302, 304 and 306, respectively, which phase relationship, as in the case of the FIG. 1 embodiment, is such that A and B are 180° apart, C and D are 180° apart and the two pairs A, B and C, D are 90° apart as indicated by the curves of FIG. 4.

Figure 4:
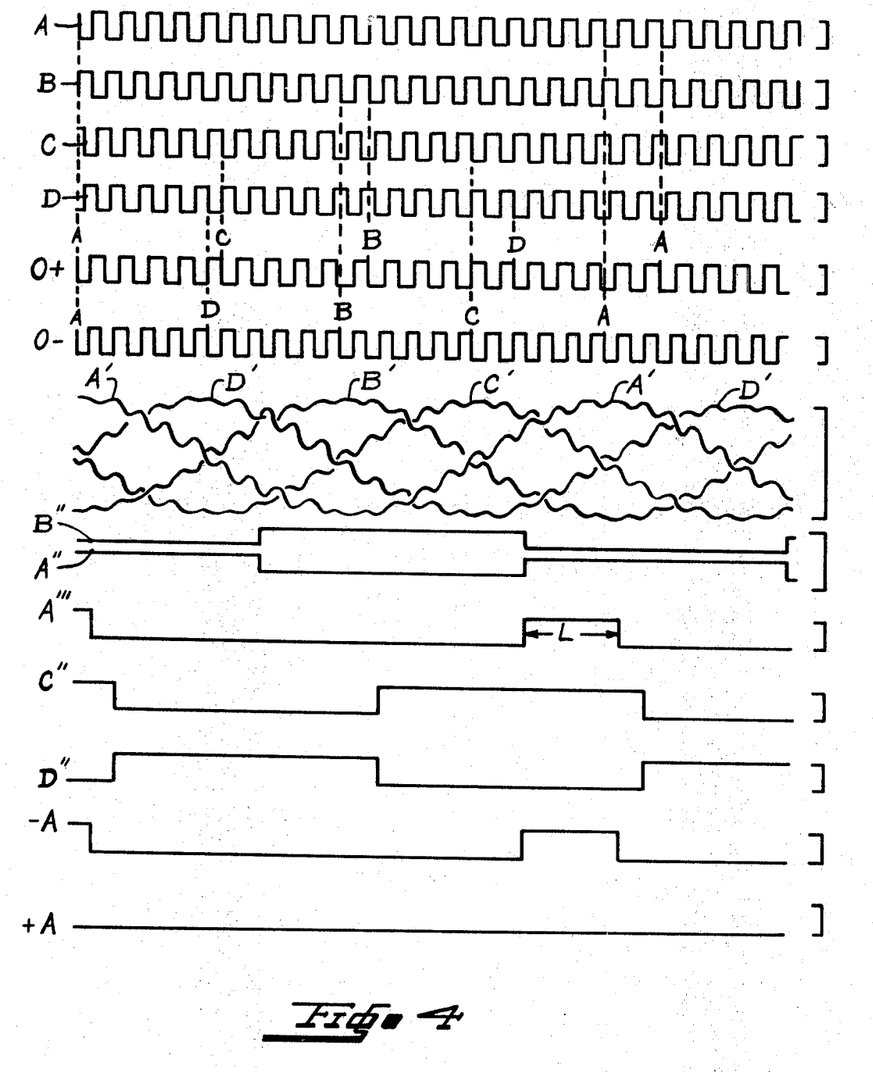
FIG. 4 illustrates a plurality of curves corresponding to the fluid pressure pulses of varying frequency generated in response to the reference pressure input and controlled condition pressure input referenced thereto as well as the phase relationship thereof which provides an indication of the relative error therebetween for the embodiment of FIG. 2.

The 0+ curve of FIG. 4 illustrates the reference speed pulse output established by tuning fork 112 and nozzle 118 relative to the engine speed generated pressure pulse output curves A, B, C and D for a 5 percent engine overspeed condition whereas the 0− curve represents a 5 percent engine underspeed condition.

The air passage and fluidic switch network of FIG. 4 is identical to that of FIG. 1 with the exception of the pressure pulse inputs to switches 166c, 166d, 166e and 166b, the pressure pulse outputs to switch 174b and the connections of the outputs of switches 174a and 174b to body 24. The reference pressure pulses generated at nozzle 118 are transmitted via passage 184 to right air control passage 164 of bistable switch 166c. Branch passage 312, 314 and 316 connect passage 184 with right control air passage 164 of bistable switches 166d, 166e and 166b, respectively. Jet receiving pipes 300, 302, 304 and 306 connect to left control air passage 152 of switches 166b, 166e, 166d and 166c, respectively.

The passages 266, 262, 273 and 275 leading to switch 174b are connected to right output passage 154 of gate switches 140i, 140k, 140j and 140L, respectively.

The pressure pulse synchronization sequences representing engine overspeed and underspeed conditions in the embodiment of FIG. 2 are reversed from that of FIG. 1. Thus, in FIG. 2, engine overspeed and underspeed conditions are represented by pressure pulse synchronization sequence A, C, B, D, A, and A, D, B, C, A, as indicated in FIG. 4. Since the synchronization sequences are reversed, the output pressure pulses of gate switches 174a and 174b represent engine underspeed and overspeed, respectively, which necessitates reversal of the output connections used and reversal of their connections with passages 92 and 94. Thus, in FIG. 2, passage 92 connects output passage 154 of gate switch 174a with check valve 96 whereas passage 94 connects output passage 150 of switch 174b with check valve 98.

The operation of the embodiment of FIG. 2 is, in general, sufficiently similar to that of FIG. 1 that a detailed explanation is not believed necessary. However, it will be recognized that the multi-phase pressure pulse inputs A, B, C and D are generated as a result of the rotation of disc 308 in response to rotation of engine shaft 22. As disc 308 rotates, the ports 310 sequentially move into registration with receiver pipes 300, 302, 304 and 306 to thereby permit pressurization thereof with the phase relationship indicated in FIG. 4. The pressure pulses generated in pipes 300, 302, 304 and 306 are transmitted to fluidic switches 166b, 166e, 166d and 166c, respectively, where they oppose reference pressure pulses generated by the tuning fork 112 with the resulting synchronization sequence of the opposing pulses controlling the output pressure of the fluidic switches 174a and 174b in a manner similar to that of FIG. 1.

The embodiment of FIG. 2 is advantageous in that it may permit better system time response through the use of a higher reference tuning fork 112 frequency in comparison to that of FIG. 1. The elimination of the fluidic switches 156b, 166a, 156a and 156c of FIG. 1 from the control network of FIG. 2 reduces the number of input stage fluidic switches to four, 166b, 166e, 166d and 166c, which may permit system operation at reference frequencies significantly higher than that of FIG. 1.

It will be understood that the above described multi-phase fluidic governor apparatus may be used to regulate engine speed by means other than fuel flow. The piston 34 could be attached to control apparatus for regulating a steam supply, pressurized air or gas, or to vary an output load.

Various changes and modifications to the above described structure may be made by those persons skilled in the art without departing from the scope of applicant's invention as defined by the following claims.

I claim:
1. A fluidic engine speed control governor for generating a series of fluid pressure pulse outputs in sequential order as a function of the relative error between a reference speed input and engine speed input comprising:
 first fluid pulse generating means responsive to one of said reference and engine speed inputs for generating a series of fluid pressure pulses having a frequency corresponding to said sensed input;
 second fluid pulse generating means responsive to the other of said reference and engine speed inputs for generating a first plurality of series of fluid pressure pulses having a common frequency and out-of-phase relationship with one another;
 a plurality of first fluidic jet switching means operatively connected to receive said series of fluid pressure pulses generated by said first pulse generating means and said plurality of series of fluid pressure pulses in pressure pulse opposing relationship for controlling switching of the fluidic jets thereof to produce a corresponding output second plurality of series of fluid pressure pulses which vary in phase relationship depending upon the synchronization sequency of said first plurality of series of fluid pressure pulses and the series of fluid pressure pulses generated by said first pulse generating means;
 a plurality of second fluidic jet switching means responsive to said second plurality of series of fluid pressure pulses and a corresponding delayed series of fluid pressure pulses derived therefrom for controlling switching of the fluidic jets thereof to produce a corresponding output third plurality of series of fluid pressure pulses which vary in a first sequential order representing an engine overspeed condition for generating an output series of fluid pressure pulses; and
 a plurality of third fluidic jet switching means responsive to said second plurality of series of fluid pressure pulses occuring in a second sequential order representing an engine underspeed condition for generating an output series of fluid pressure pulses.

2. A fluidic engine speed control governor as claimed in claim 1 wherein:
 said first fluid pressure pulse generating means is responsive to said engine speed input and includes engine driven fluid pressure pulse generating means for generating a series of fluid pressure pulses having a frequency variable as a function of engine speed;
 said second fluid pressure pulse generating means is responsive to said reference input and includes means for generating a second series of fluid pressure pulses at a desired frequency;
 fluid jet switching means responsive to said second series of fluid pressure pulses for generating third, fourth, fifth and sixth series of fluid pressure pulses in response to said second series of fluid pressure pulses; and said third and fourth series of fluid pressure pulses having a 180° out-of-phase relationship with each other and a 90° out-of-phase relationship with said fifth and sixth series of fluid pressure pulses.

3. A fluidic engine speed control governor as claimed in claim 1 wherein:

said first fluid pressure pulse generating means is responsive to said reference input and operative to generate a series of fluid pressure pulses having a frequency variable as a function of said reference input;

said second fluid pressure pulse generating means is responsive to engine speed and operative to generate first, second, third and fourth series of fluid pressure pulses;

said first and second series of fluid pressure pulses having a 180° out-of-phase relationship; and said third and fourth series of fluid pressure pulses having a 180° out-of-phase relationship with each other and a 90° out-of-phase relationship with said first and second series of fluid pressure pulses.

4. A fluidic engine speed control governor as claimed in claim 1 wherein:

said last named means for controlling engine operation includes a first chamber partially defined by a fluid pressure responsive member;

said first chamber having first and second passage means connected to said second and third fluidic jet switching means, respectively;

first valve means operatively connected to said second passage for permitting one way fluid flow therethrough into said first chamber; and second valve means operatively connected to said first passage for permitting one way fluid flow out of said first chamber.

5. A fluidic engine speed control governor as claimed in claim 4 wherein said last named means for controlling engine operation further includes:

a second chamber separated from said first chamber by said fluid pressure responsive member;

a fluidic jet switching device having first and second opposed input control fluid passages and first and second output passages;

said first and second input passages being connected to receive a series of fluid pressure pulses having a frequency variable with engine speed;

means operatively connected to said first input passage for imposing a delay on said series of fluid pressure pulses transmitted therethrough; and said second chamber communicating with one of said first and second output passages and receiving an output series of fluid pressure pulses therefrom which have a fixed amplitude and duration.

6. A fluidic engine speed control governor as claimed in claim 1 wherein:

said second fluid pressure pulse generating means is responsive to said reference input and includes a nozzle connected to receive pressurized air flow and a tuning fork operatively connected thereto for varying the effective flow area thereof to generate a second series of pressure pulses upstream from said nozzle;

a fluidic switch having a first control fluid passage connected receive said second series of pressure pulses, a second control fluid passage supplied with a bias pressure intermediate to the minimum and maximum of said series of pressure pulses, and first, second and third output passages for producing third, fourth and fifth series of pressure pulses in response to said second series of pressure pulses;

a first fluidic bistable switch having third and fourth control fluid passages connected to receive said third and fourth series of pressure pulses, respectively, and fourth and fifth output passages for producing sixth and seventh series of pressure pulses in response to said third and fourth series of pressure pulses;

a second fluidic bistable switch having fifth and sixth control fluid passages connected to receive said sixth and seventh series of pressure pulses, respectively, and sixth and seventh output passages for producing eighth and ninth series of pressure pulses in response to said sixth and seventh series of pressure pulses;

said second bistable switch having an input passage connected to receive said fifth series of pressure pulses;

a third fluidic bistable switch having seventh and eighth control fluid passages connected to receive said eighth and ninth series of pressure pulses, respectively, and eighth and ninth output passages for producing tenth and eleventh series of pressure pulses in response to said eighth and ninth series of pressure pulses; and said plurality of first jet switching means being connected to respond to said sixth and seventh series of pressure pulses generated by said first fluidic bistable switch and said tenth and eleventh series of pressure pulses generated by said third fluidic bistable switch and said series of fluid pressure pulses generated by said first pulse generating means.

7. A fluidic engine speed control governor as claimed in claim 1 wherein:

said first fluid pulse generating means is responsive to said engine speed input and includes a rotatable disc actuated by the engine and provided with a plurality of spaced apart openings;

a plurality of spaced apart fluid jet receiving pipes and coaxial fluid jet generating means aligned therewith; and said rotatable disc separating said plurality of pipes from said fluid jet generating means and rotatable relative thereto to bring said spaced apart openings into alignment with said jet receiving pipes in predetermined order thereby establishing a series of fluid pressure pulses in said jet receiving pipes which have a predetermined relative phase relationship and a common frequency.

8. A fluidic engine speed control governor as claimed in claim 2 wherein:

said fluid jet switching means includes first, second, third and fourth fluidic switches each having opposed first and second control fluid passages and an output passage for producing a series of pressure pulses;

said first fluidic switch having its first and second control fluid passage connected to receive said third series of pressure pulses and said series of pressure pulses generated by said engine driven pulse generating means, respectively;

said second fluidic switch having its first and second control fluid passages connected to receive said fourth series of pressure pulses and said series of pressure pulses generated by said engine driven pulse generating means, respectively;

said third fluidic switch having its first and second control fluid passages connected to receive said fifth series of pressure pulses and said series of pressure pulses generated by said engine driven pulse generating means, respectively;

said fourth fluidic switch having its first and second control fluid passages connected to receive said sixth series of pressure pulses and said series of pressure pulses generated by said engine driven pulse generating means, respectively;

a first fluidic bistable switch having opposed first and second control fluid passages connected to receive said output passage series of pressure pulses from said first and second fluidic switches, respectively;

a second fluidic bistable switch having opposed first and second control fluid passages connected to receive said output passage series of pressure pulses from said third and fourth fluidic switches, respectively;

said first and second fluidic bistable switches each having first and second output passages for producing corresponding output series of pressure pulses; and a plurality of fluidic gate switches connected to receive said output series of pressure pulses from said first and second fluidic bistable switches.

9. A fluidic engine speed control governor as claimed in claim 4 and further including:

a source of pressurized fuel connected to supply fuel to the engine; and fuel control valve means operatively connected to said fluid pressure responsive member and actuated thereby for controlling fuel flow from said source to the engine.

10. A fluidic engine speed control governor as claimed in claim 4 wherein:

said first valve means is pressure pulse actuated to an open position to permit passage of said output series of fluid pressure pulses generated by said third fluidic jet switching means into said first chamber to cause a corresponding increase in fluid pressure therein.

11. A fluidic engine speed control governor as claimed in claim 4 wherein:

said second valve means is responsive to the fluid pressure in said first chamber and said output series of fluid pressure pulses generated by said second fluidic jet switching means and actuated to an open position to cause a corresponding decrease in fluid pressure in said first chamber.

12. A fluidic engine speed control governor as claimed in claim 1 wherein:

said first fluid pulse generating means is responsive to said reference speed input and includes a nozzle connected to receive pressurized air flow and a tuning fork operatively connected thereto for varying the effective flow area thereof to generate said series of fluid pressure pulses upstream from said nozzle; and control means operatively connected to said tuning fork for varying the frequency of vibration thereof and thus the frequency of said series of fluid pressure pulses.